(12) United States Patent
Shao et al.

(10) Patent No.: US 8,314,903 B2
(45) Date of Patent: Nov. 20, 2012

(54) COLOR SUBSTRATE, MANUFACTURING METHOD THEREOF AND LIQUID CRYSTAL DISPLAY

(75) Inventors: Xibin Shao, Beijing (CN); Jingwei Liu, Beijing (CN); Gang Wang, Beijing (CN); Xiaodong Liu, Beijing (CN); Jiaheng Wang, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 755 days.

(21) Appl. No.: 12/334,396

(22) Filed: Dec. 12, 2008

(65) Prior Publication Data

US 2009/0161035 A1    Jun. 25, 2009

(30) Foreign Application Priority Data

Dec. 19, 2007 (CN) .......................... 2007 1 0179927

(51) Int. Cl.
*G02F 1/1335* (2006.01)
*G02F 1/1333* (2006.01)
(52) U.S. Cl. ............ 349/106; 349/96; 349/122; 349/110
(58) Field of Classification Search .................. None
See application file for complete search history.

(56) References Cited

U.S. PATENT DOCUMENTS

| 7,259,811 | B2 * | 8/2007 | Kim ................. | 349/106 |
| 7,605,883 | B2 * | 10/2009 | Yamaki et al. ........ | 349/96 |
| 2002/0097370 | A1 * | 7/2002 | Nose et al. ........... | 349/187 |
| 2006/0119915 | A1 | 6/2006 | Sugiura et al. | |
| 2006/0146229 | A1 | 7/2006 | Cho et al. | |
| 2006/0232732 | A1 * | 10/2006 | Hwang et al. ......... | 349/115 |
| 2007/0151469 | A1 * | 7/2007 | Jeong .................... | 101/215 |

FOREIGN PATENT DOCUMENTS

| CN | 1271425 | A | 10/2000 |
| CN | 1769970 | A | 5/2006 |
| CN | 1786795 | A | 6/2006 |
| EP | 1 004 921 | A1 | 5/2000 |
| JP | 09-218306 | A | 8/1997 |

OTHER PUBLICATIONS

Chinese Examination Report issued on Feb. 27, 2009 in Chinese Application No. 200710179927.6 and its English Translation.

* cited by examiner

*Primary Examiner* — Wen-Ying P Chen
(74) *Attorney, Agent, or Firm* — Ladas & Parry LLP

(57) ABSTRACT

Disclosed are a color substrate, a manufacturing method thereof and a liquid crystal display. The color substrate comprises a substrate; black matrices disposed on the substrate; color pixels whose material is fluorescent material disposed alternately among the black matrices; a flat encapsulation layer covering the black matrices and the color pixel; and a built-in polarizer attached to the flat encapsulation layer. The manufacturing method comprises forming black matrices on a substrate, and forming color pixels of fluorescent material among the black matrices; form a flat encapsulation layer; and form a built-in polarizer. The liquid crystal display by using the color substrate of the present invention further comprises a array substrate, a liquid crystal layer and a back light wherein wavelength of light emitted by the back light is shorter than of equal to stimulated luminescence critical wavelength of fluorescent material of the color pixels on the color substrate. In the present invention, the color fluorescent material is used for replacing the color resin material on the color substrate, the lamination mode is changed and the energy loss resulting from light-absorbing of the resin material is decreased, which could increase the light utilization efficiency and improve the visual angle characteristic of the liquid crystal display.

17 Claims, 3 Drawing Sheets

COLOR SUBSTRATE, MANUFACTURING METHOD THEREOF AND LIQUID CRYSTAL DISPLAY

CROSS-REFERENCE TO RELATED APPLICATIONS

This application claims the priority benefit of China Patent Application No. 200710179927.6, filed on Dec. 19, 2007, entitled "Color Substrate, Manufacturing Method thereof and Liquid Crystal Display", which is incorporated herein by reference in its entirety.

FIELD OF THE TECHNOLOGY

This application relates to a color substrate, a manufacturing method thereof and a liquid crystal display, and particularly to a color substrate comprising black matrices and color pixels which are disposed alternately and a manufacturing method thereof, and a liquid crystal display by using this color substrate.

BACKGROUND OF THE INVENTION

Prior to now, color liquid crystal displays have been widely applied to people's life and production, wherein color display characteristic and visual angle characteristic of the liquid crystal displays are important display indexes which are taken more and more attention.

In terms of the color display characteristic, a technical means utilized by the prior liquid crystal display device is to dispose a color filter made by resin material so as to accomplish the color display characteristic. Each one of color pixels in the color filter corresponds to one color among three primary colors such as red, green and blue. When the back light emits the lights of which spectrum range covers three colors of red, blue and green, due to filter action of the resin material, the color pixels having one certain color allow lights having corresponding color to permeate and absorb the lights having the other two colors so as to accomplish the color display characteristic of the liquid crystal display. Although this technology accomplishes the color display, it has a problem that light utilization efficiency decreases sharply. The reasons is as follows: at one hand, light filtering action of the color filter makes most lights emitted by the back light be absorbed, and the light utilization efficiency is less than $1/3$; at the other hand, because all the back lights belonging to fluorescent lamp type emit lights by stimulating the fluorescent powder coated on the lamp tube wall via ultraviolet rays, and back lights belonging to white LED type emit lights by stimulating the fluorescent powder coated on the lamp tube wall via shortwave light projected from the diode chip, namely via the purple lights or the blue lights emitted, therefore, light energy consumption phenomenon caused by stimulating the fluorescent material to emit lights exist in all the prior back lights. The conventional color liquid crystal display exists at least two times of light energy consumptions, thus the energy utilization efficiency will decreased sharply, which not only results the luminance of the liquid crystal display is low, but also the energy used for ensuring the display luminance will be higher.

In terms of the visual angle characteristic, the liquid crystal display generally adopts birefringence technology or optical rotation technology to control light intensity. Limited to the working principle of displaying of liquid crystal display, the lights, after emitted by the back light, will orderly pass through a lower polarizer, a liquid crystal layer and an upper polarizer. Under the incline action of the liquid crystal molecules, the optical path difference among the lights having various incident angles is different, and the result is that visual angle of the liquid crystal display generally is narrower. So called visual angle, it is a visual range in which people could normally observe image luminance, contrast and color on the screen of the liquid crystal display. The narrow visual angle will result in that the contrast and color of images deviate when the viewer views the images with a much larger angle. Thus, compared with an active emitting light display apparatus, the visual angle characteristic of the prior liquid crystal display is worse. In order to solve the above problem, the prior technologies develop many modes, such as optical membrane compensation mode, multi-domain vertical alignment (MVA) mode, patterned vertical alignment (PVA) mode, in-plane switching (IPS) mode, fringe field switch (FFS) mode, to improve the visual angle characteristic of the liquid crystal display. However, the above technology could only reduce the difference between the paths of the lights having various incident angles, rather than eliminate the difference completely. The improvement to the vision is also finite. The above modes make the structure of the liquid crystal display complex so the difficulty for process is increased.

SUMMARY OF CERTAIN INVENTIVE ASPECTS

Certain aspects described herein provide a color substrate, a manufacturing method thereof and a liquid crystal display so as to increase the light utilization efficiency of the liquid crystal display, enhance the display luminance, decrease the energy consumption and avoid the deviation of the contrast and color of the image when viewed from various angles to improve the visual angle characteristic of the liquid crystal display.

A first aspect described herein provides a color substrate which includes:
 a substrate;
 black matrices disposed on the substrate in the form of a matrix arrangement;
 color pixels disposed alternately among the black matrices, wherein material of the color pixels is fluorescent material;
 a flat encapsulation layer covering the black matrices and the color pixels; and
 a built-in polarizer attached to the flat encapsulation layer.

A second aspect described herein provides a manufacturing method of the color substrate which includes the following steps:
 forming black matrices on a substrate in the form of a matrix arrangement, and forming color pixels of fluorescent material among the black matrices;
 forming a flat encapsulation layer over the substrate; and
 forming a built-in polarizer on the flat encapsulation layer.

A third aspect described herein provides a liquid crystal display by using the color substrate described in certain embodiments. The liquid crystal display includes an array substrate disposed to face the color substrate, a liquid crystal layer disposed between the color substrate and the array substrate, and a back light disposed at one side of the array substrate departed from the color substrate, wherein wavelength of light emitted by the back light is shorter than or equal to stimulated luminescence critical wavelength of fluorescent material of the color pixels on the color substrate.

It can been known from the above technical solution that the color fluorescent material is used for replacing the color resin material on the color substrate in certain embodiments, the fluorescent material could emit lights directly under the stimulation of shortwave length lights. Therefore, the energy loss resulting from light-absorbing of the resin material is decreased and the problem of low light utilization efficiency in the prior art can be solved. At the same time, because certain embodiments use a technical means that the color substrate emits lights actively, the visual angle characteristic of the liquid crystal display achieves the visual angle characteristic of active luminescent display. Some of the benefits of certain embodiments are as follows:

1. The color display mode of the liquid crystal display uses a light stimulation mode of the fluorescent material to replace a light absorption mode of the prior resin material, which could increase the light energy utilization efficiency up to more than 50%. Therefore, the display luminance of the liquid crystal display could be increased and the energy consumption could be decreased;

2. The color lights are from emission of the fluorescent material of the color substrate on the surface of the liquid crystal display, which do not pass through the liquid crystal layer. The contrast of color could not deviate when the image is viewed from various angles. Thus, it could have equal visual angle characteristic with the active luminescent display, such as cathode ray tube. Certain embodiments improve the visual angle characteristic of the liquid crystal display on the premise of not depending on the liquid crystal display mode and the design of the optical construction;

3. The polarizer is disposed inside of the color substrate of the liquid crystal display, the amount of appurtenant parts in the liquid crystal display is reduced, which makes the display more flimsy;

4. Because all of the refractive ration, the absorptivity and the like parameters of most optical materials used in the liquid crystal display depend on the light wavelength, it is very difficult to make various optical materials in the liquid crystal display achieve the optimal optical effect under the back light with all wavelength coverage. One embodiment adopts a back light with a single wavelength or narrower wavelength coverage, so it is favorable for optimizing the design of the optical material.

Certain embodiments will be described in more detail with reference to the drawings and embodiments.

DETAILED DESCRIPTION OF CERTAIN EMBODIMENTS

Embodiment One of Color Substrate

Figure 1:
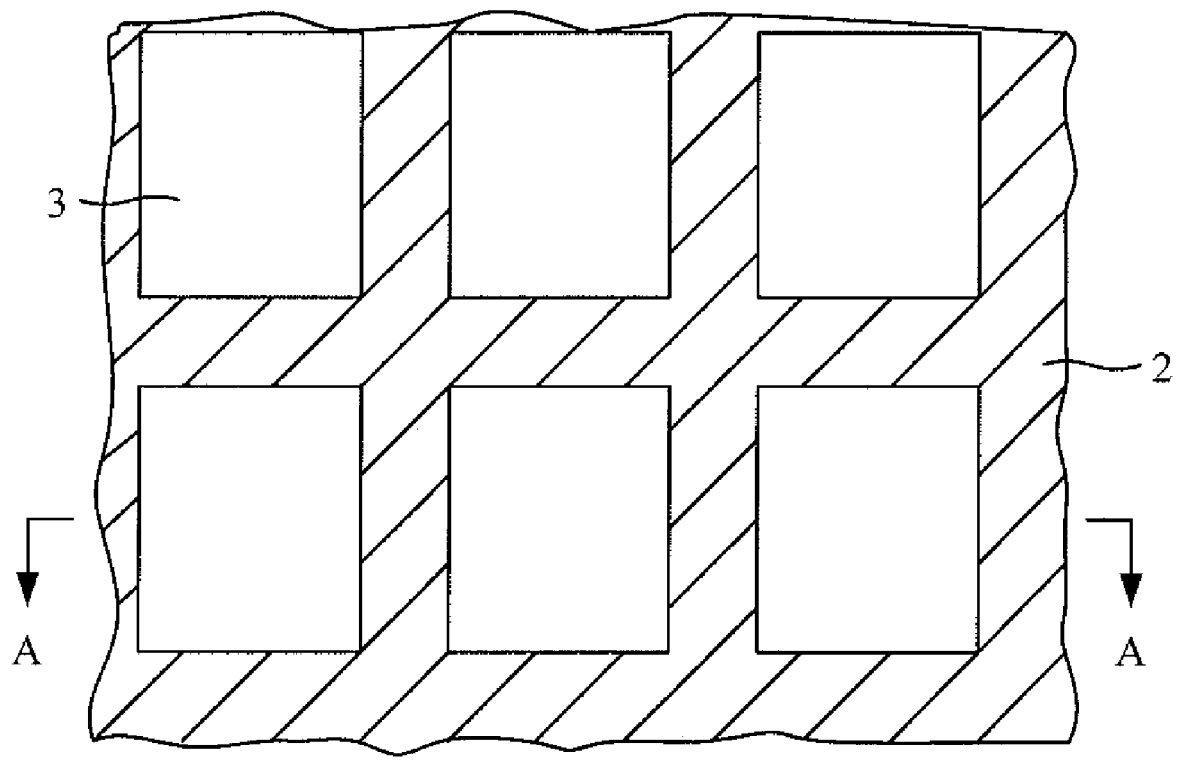
FIG. 1 is a schematic structure top view of a color substrate according to a first embodiment.
Figure 2:
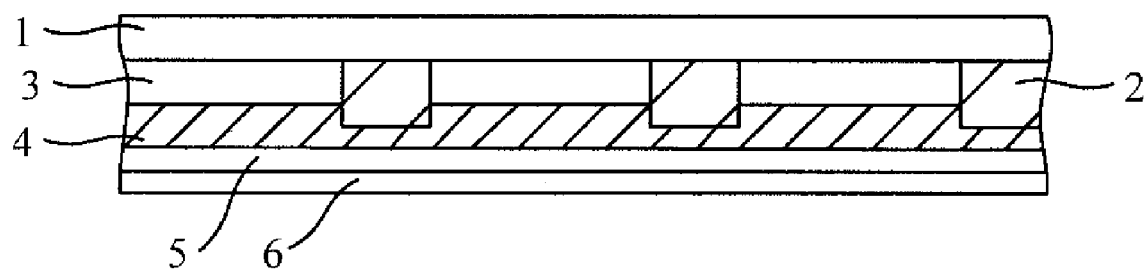
FIG. 2 is a schematic structure cross section view along A-A line in FIG. 1.

FIG. 1 is a schematic structure top view of a color substrate according to a first embodiment, and FIG. 2 is a cross section view along A-A line in FIG. 1. The color substrate may be a functional part which is used to be disposed in a liquid crystal display so as to accomplish a color display function. The specific structure of the color substrate includes a substrate 1, black matrices 2 disposed on the substrate 1 in the form of a matrix arrangement, and color pixels 3 alternately disposed on the substrate 1 among the black matrices 2. The color pixels 3 generally are set as three primary colors such as red, green and blue. The material of the color pixels 3 is fluorescent material, which can emit lights having a corresponding color when stimulated by a certain wavelength light. Depending on the difference of the fluorescent materials, the wavelength of the light required by the fluorescent materials to be stimulated to emit lights is also different. The maximal wavelength which can stimulate the fluorescent material to emit lights is defined as stimulated luminescence critical wavelength of the fluorescent material. The color substrate further includes a flat encapsulation layer 4 covering the black matrices 2 and the color pixels 3, and a built-in polarizer 5 attached to the flat encapsulation layer 4.

The black matrices in the present embodiment may be made by resin material, Chrome metal or Chrome metal oxide. The black matrices may be also formed by overlapping any combinations of the above materials. The black matrices may be disposed on the substrate in the form of a matrix arrangement or a grid.

The material of the color pixels in the present embodiment may be inorganic fluorescent material, for example, the red fluorescent material may be Yttrium Aluminitum garnet stimulated by trivalent Europium, the blue fluorescent material may be Strontium/Calcium Chlorophosphate stimulated by bivalent Europium, and the green fluorescent material may be Yttrium Aluminitum garnet stimulated by Cerium. The inorganic fluorescent material may be a material which could emit lights under the stimulation of short wavelength, of which wavelength ranges from 350 nm to 480 nm. The material of the color pixels may be also organic fluorescent material, for example, one or a combination of many laser dyes, which include but is not limited to rhodamine type, coumarin type, azo type, anthraquinone type, perinaphtenone type, oxazine type or perylene type; or material in which trivalent rare earth ions of $Sm^{3+}$, $Eu^{3+}$, $Tb^{3+}$ and $Dy^{3+}$ are central metal ions β-diketone, fragrant tobacco and heterocycle types of binary or multivariant metal complex.

In the present embodiment when the fluorescent material is the inorganic fluorescent material, the flat encapsulation layer may be made by the organic material, for example, "Optmer SS" series thermal curing resin produced by "JSR" Corporation. When the fluorescent material is the organic fluorescent material, the flat encapsulation layer may be a film formed by overlapping the well airtight organic polymer and an inorganic membrane, wherein the material of the inorganic membrane may be $SiO_2$ or $SiN_x$. The flat encapsulation layer covers the color pixels and the black matrices so as to protect the fluorescent material, at the same time, it can flatten the surfaces formed by the color pixels and the black matrices.

The built-in polarizer in the present embodiment may be a metal grid. The built-in polarizer may be also made by using the organic self-assembly material including dye, for example the organic self-assembly material of "TCF No.15" of "Optiva" company. Or the built-in polarizer may be also a multilayer overlapping film of organic material having anisotropic refractive index. The built-in polarizer is a polarization apparatus that the lights emit from the liquid crystal layer to the fluorescent material side. The prior liquid crystal display is composed of the color substrate and the array substrate which face each other in a cell. The liquid crystal layer is disposed between the color substrate and the array substrate. The upper and lower polarizers are disposed at the two sides of the liquid crystal layer, and generally are disposed at the outer sides of the color substrate and the array substrate respectively. The lights are finally emitted out of the liquid crystal display passing through two layers of the polarizers so as to display images normally. Based on this principle, because the color substrate of the present embodiment is that the fluorescent material is stimulated to emit lights, the position of emitting lights is located at the upside of the liquid crystal layer. Therefore, if the polarizer is still disposed at the outer side of the color substrate, lights emitted by the light source only pass through the polarizer and the liquid crystal layer at the side of the array substrate to shine on the fluorescent material, the liquid crystal could not play a role in light intensity modulation and lights emitted from the fluorescent material could not maintain a polarization characteristic of the incident lights yet. Thus the images could not be displayed normally. Therefore, in the present embodiment, one polarizer is disposed inside of the color substrate, which makes lights emitted by the light source pass through two polarizers and the liquid crystal layer before arriving at the fluorescent material.

In the color substrate of the present embodiment, a transparent electric conducting layer 6 may be further disposed on the built-in polarizer 5, as shown in FIG. 2. The transparent electric conducting layer 6 may be made by tin indium oxide or zinc oxide, which is equivalent to the common electrode in the prior color liquid crystal display.

When the color substrate in the present embodiment is applied to the liquid crystal display, correspondingly, the liquid crystal display utilizes a light source which can stimulate the color pixels of the fluorescent material to emit lights and project shortwave lights as a back light. Its principle of work is that when the shortwave lights emitted by the back light are transmitted to the color pixels on the color substrate, because the color pixels are made by the inorganic fluorescent material or the organic fluorescent material, the fluorescent material can be stimulated to emit lights with corresponding color, so that the color display characteristic of the liquid crystal display could be accomplished.

In the technical solution of the present embodiment, an active emitting light mode of the color pixels is adopted to accomplish the color display effect, which avoids the resin material filter absorbing the lights, and the light utilization efficiency could be increased up to more than 50%. At the same time, the active emitting light mode of the color pixels on the color substrate avoids a difference among the optical path difference of the lights with various incidence angles passing through the liquid crystal layer, and then avoids the contrast and the color of the images deviating along with the viewing angle changing. The visual angle characteristic of the liquid crystal display could be improved, and make the liquid crystal display has a visual angle characteristic which is equivalent to the active luminescent display.

The color substrate of certain embodiments could be applied to all the color liquid crystal displays, such as the thin film transistor liquid crystal display (TFT-LCD) and the color super twist nematic liquid crystal display (STN-LCD).

Embodiment Two of Color Substrate

Figure 3:
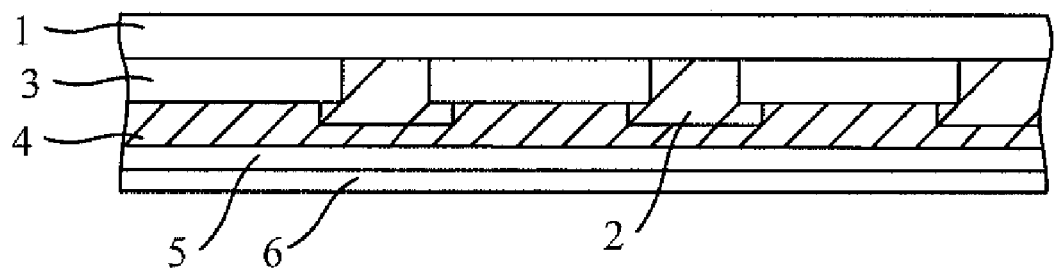
FIG. 3 is a schematic structure cross section view of a color substrate according to a second embodiment.

FIG. 3 is a schematic structure cross section view of the color substrate according to a second embodiment. The present embodiment is similar to the embodiment one, the difference is that in grid lines which compose the black matrices 2, the longitudinal cross-section shape of each of lines is a T shape. Bulgy edges of the T shape cross-sections of the black matrices 2 cover the edges of the adjacent color pixels 3.

This technical solution could prevent the lights emitted from the fluorescent material from damaging thin film transistors when the lights emit to the thin film transistors. Particularly to the thin film transistors made by amorphous silicon material, the function of this solution is more prominent.

In one embodiment, the manufacturing method of color substrate may comprise the following steps:

forming black matrices on a substrate in the form of a matrix arrangement, and forming color pixels of fluorescent material among the black matrices;

forming a flat encapsulation layer over the substrate; and forming a built-in polarizer on said flat encapsulation layer.

Further, after forming the built-in polarizer, the method may further comprise the step of depositing transparent electric conducting material on the built-in polarizer so as to form a transparent electric conducting layer.

In one aspect of the above technical solution, the steps of forming black matrices on a substrate in the form of a matrix arrangement, and forming color pixels of fluorescent material among the black matrices may comprise:

coating pasty inorganic fluorescent material on the substrate, and forming the color pixels in the form of a matrix arrangement by exposing and etching process;

forming the black matrices on the substrate, wherein the black matrices are alternately disposed among the color pixels.

Based on the above technical solution, the step of forming the flat encapsulation layer may comprise the steps of coating organic encapsulation material on the above substrate and forming the flat encapsulation layer by thermal curing process.

In another aspect of the above technical solution, the steps of forming black matrices on a substrate in the form of a matrix arrangement, and forming color pixels of fluorescent material among the black matrices may comprise:

forming the black matrices on the substrate in the form of the matrix arrangement;

forming the color pixels on the above substrate by mask vaporizing organic fluorescent material or ink-jet printing organic fluorescent material, wherein the color pixels are alternately disposed among the black matrices.

Based on the above technical solution, the step of forming the flat encapsulation layer may comprise orderly overlapping organic polymer or inorganic material on the above substrate by sputtering, chemical vapor deposition or thermal evaporation so as to form the flat encapsulation layer.

In the above technical solutions, the step of forming the built-in polarizer may comprise coating organic self-assembly material on the flat encapsulation layer, and curing and forming the organic self-assembly material by thermal curing or light-cured so as to form the built-in polarizer.

Alternatively, the step of forming the built-in polarizer may comprise depositing metal material on the flat encapsulation layer and forming the built-in polarizer in the form of metal grid by disposing and etching process.

Alternatively, the step of forming the built-in polarizer may comprise attaching an organic film with anisotropic refractive index on the flat encapsulation layer so as to form the built-in polarizer.

Embodiment One of Manufacturing Method of Color Substrate

Figure 4:
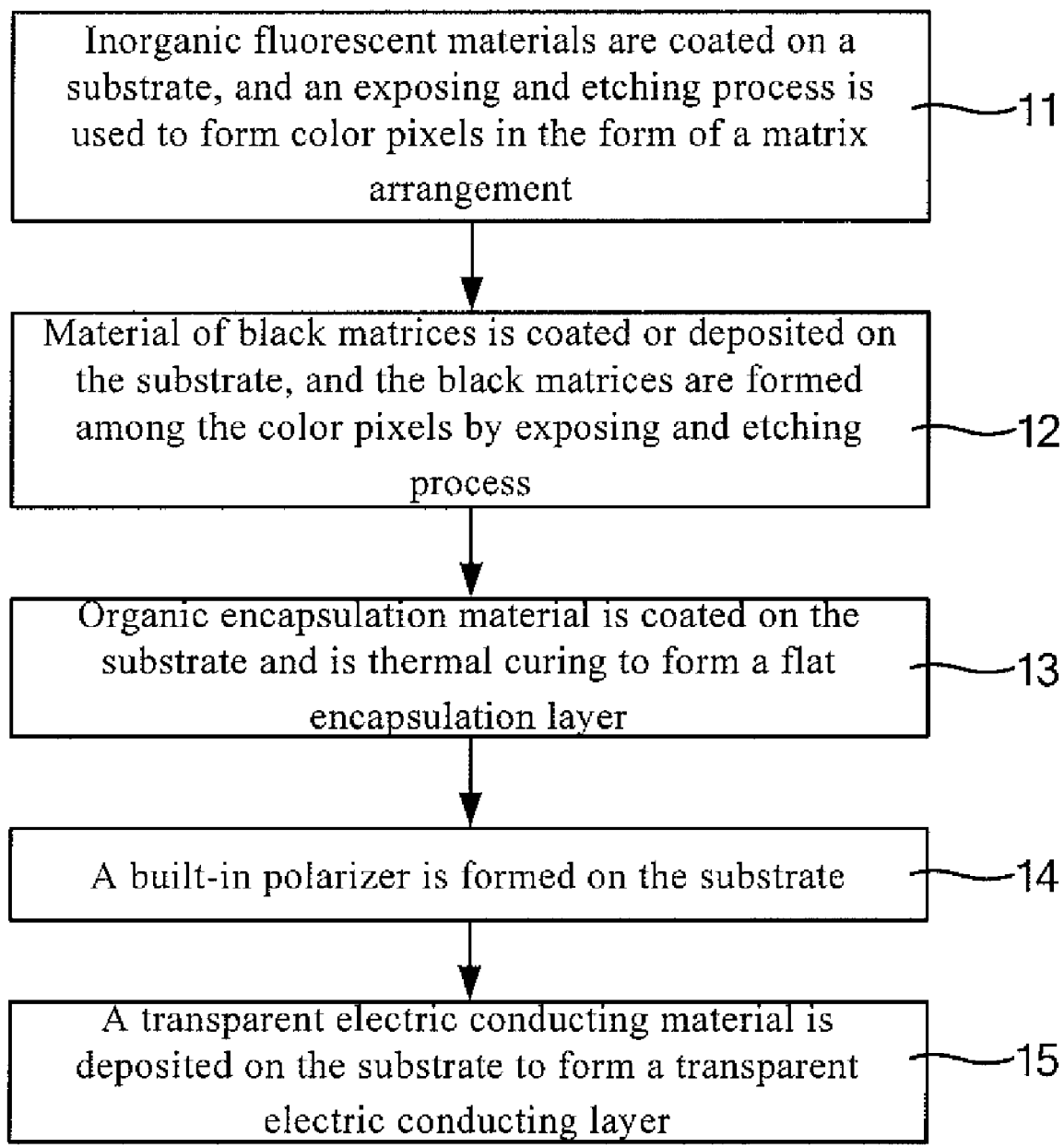
FIG. 4 is a flow chart of a manufacturing method of color substrate according to the first embodiment.

FIG. 4 is a flow chart of a manufacturing method of color substrate according to the first embodiment. This method may be used to manufacture the color substrate, and the method includes the following steps:

Step 11, the pasty inorganic fluorescent materials comprising three primary colors such as red, green and blue are coated on a substrate respectively, and an exposing and etching process is used to form a pattern on the inorganic fluorescent material in the form of a matrix arrangement as color pixels, wherein the pasty inorganic fluorescent material is made by inorganic fluorescent powder appended photosensitive glue;

Step 12, material of black matrices is coated or deposited on the substrate gotten through the step 11, and the black matrices are formed by exposing and etching process. The black matrices are alternately disposed among the color pixels. One embodiment is to make the longitudinal cross-section shape of the lines of the black matrices as a T shape and make the bulgy edges of the T shape cross sections cover the edges of the adjacent color pixels, wherein the material of the black matrices may be resin, chrome metal or chrome metal oxide, or the black matrices may be also form by overlapping and depositing any combinations of the above materials;

Step 13, a flat encapsulation layer is formed by coating organic encapsulation material on the substrate gotten through the step 12. For the organic encapsulation material, it may be concretely coated by using spin-coating or slit-coating and may be formed by thermal curing process.

Step 14, a built-in polarizer is formed on the substrate gotten through the step 13;

Step 15, transparent electric conducting material could be further deposited on the substrate gotten through the step 14 to form a transparent electric conducting layer. Concretely, tin indium oxide or zinc oxide material could be deposited. The transparent electric conducting layer could be taken as a common electrode.

There may be many means for forming the built-in polarizer in the step 14 of the present embodiment. One embodiment of the means is to coat organic self-assembly material on the substrate gotten through the step 13 and make the organic self-assembly material be cured and formed by thermal curing or light-cured so as to be the built-in polarizer.

Another embodiment is to deposit metal material on the substrate gotten through the step 13, and form the corresponding pattern by using the exposing and etching process so as to make the built-in polarizer in the form of the metal grid.

The other embodiment is to attach a multilayer organic film with anisotropic refractive index on the substrate gotten through the step 13, viz. on the flat encapsulation layer, so as to be the built-in polarizer.

The technical solution of the present embodiment could be used to manufacture the color substrate of the certain embodiments. The manufacture process is simple and the adjustment on the prior process is less so it is easy to be popularized. When the color substrate made by this method is applied to a liquid crystal display, the light utilization efficiency could be increased and the visual angle characteristic of the liquid crystal display could be improved.

Embodiment Two of Manufacturing Method of Color Substrate

Figure 5:
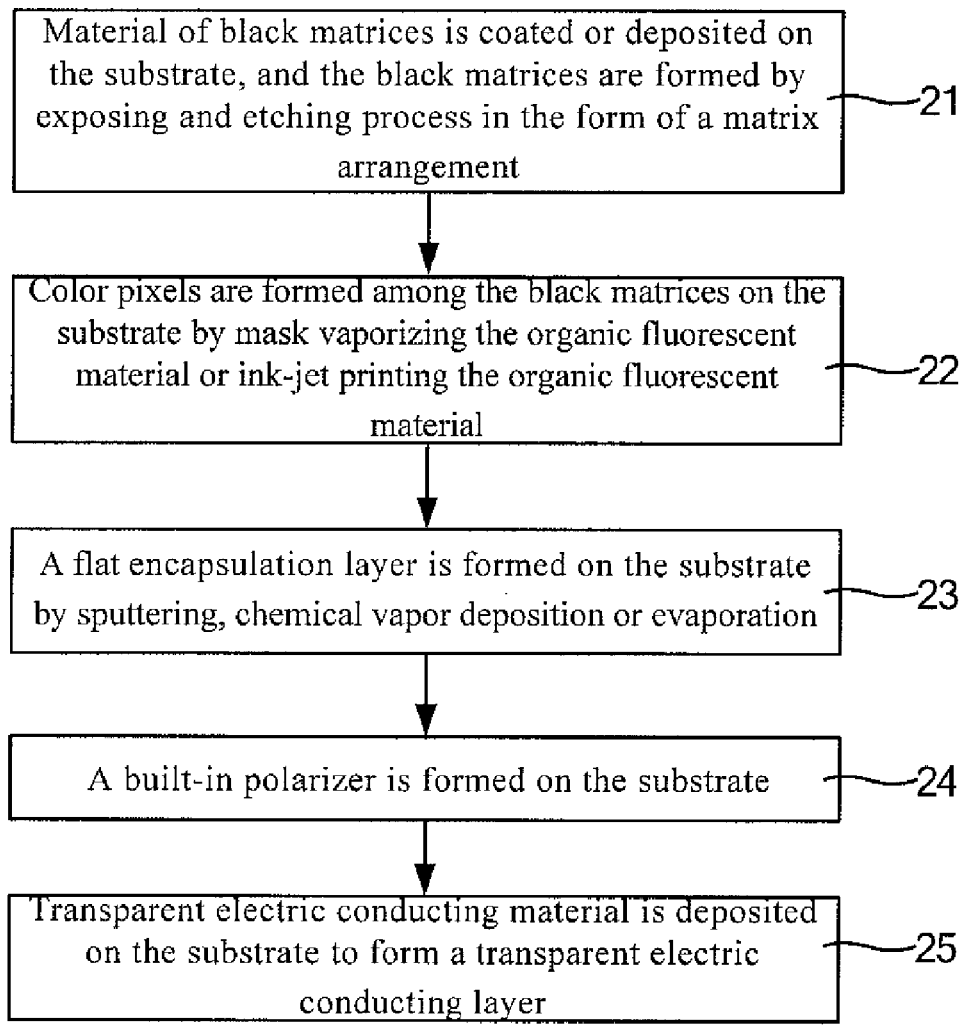
FIG. 5 is a flow chart of a manufacturing method of color substrate according to the second embodiment.

FIG. 5 is a flow chart of a manufacturing method of color substrate according to a second embodiment. The present embodiment may be used to manufacture the color substrate. The difference between technical solutions of the present embodiment and the Embodiment One is that the steps 11-13 is replaced by executing steps 21-23 as follows:

Step 21, material of black matrices is coated or deposited on the substrate, and the black matrices are formed by exposing and etching process in the form of a matrix arrangement. The material of the black matrices may be resin, chrome metal or chrome metal oxide, or the black matrices may be formed by overlapping any combinations of the above materials;

Step 22, color pixels are formed on the substrate gotten through the step 21 by mask vaporizing the organic fluorescent material or ink-jet printing the organic fluorescent material. The color pixels are alternately disposed among the black matrices;

Step 23, organic polymer and inorganic material are orderly overlapped on the substrate gotten through the step 22 by sputtering, chemical vapor deposition or evaporation so as to form an inorganic and organic laminated construction.

Step 24, a built-in polarizer is formed on the substrate gotten through the step 23; and Step 25, a transparent electric conducting layer is formed on the substrate gotten through the step 24.

In the manufacturing method of the color substrate in the present embodiment, the manufacture procedures of the color pixels and the black matrices are different from the Embodiment One, which depend on the material for making the color pixels. When the inorganic fluorescent material is used, the color pixels may be formed firstly, and then the black matrices are formed so as to make the black matrices cover the edges of the inorganic fluorescent material. When the organic fluorescent material is used, the black matrices may be formed firstly to ensure the color pixels to be filled among the black matrices with exact position.

The means for manufacturing the built-in polarizer and the transparent electric conducting layer in the present embodiment is substantially same as the means in Embodiment One.

When the color substrate manufactured by the technical solution of the present embodiment is applied to a liquid crystal display, the light utilization efficiency could be increased and the visual angle characteristic of the liquid crystal display could be improved, at the same time, the manufacturing method is simple and could be accomplished simply.

Embodiment of Liquid Crystal Display

Figure 6:
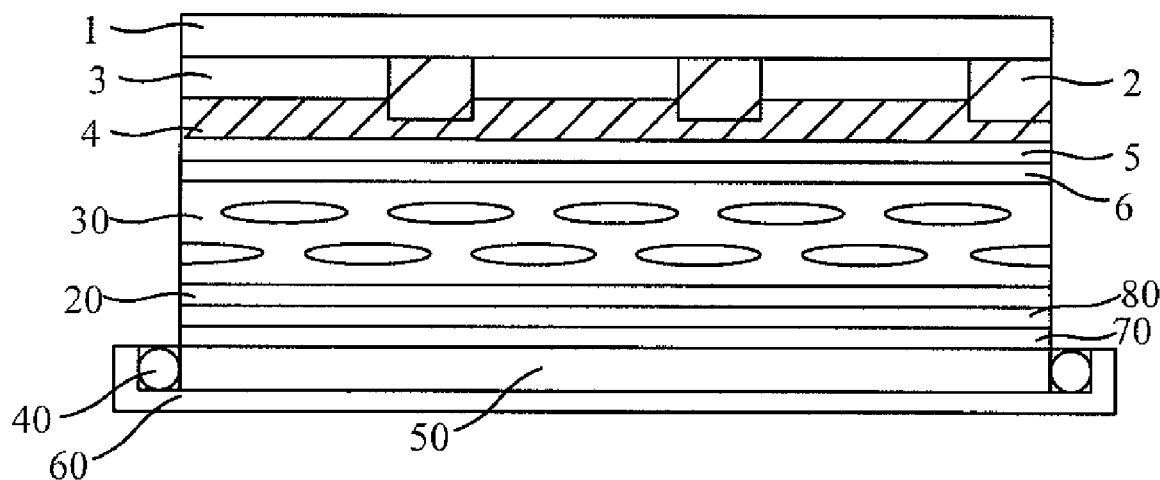
FIG. 6 is a schematic structure cross section view of a liquid crystal display according to an embodiment of the present invention.

FIG. 6 is a schematic structure cross section view of a liquid crystal display according to an embodiment. The liquid crystal display includes a color substrate 10 and an array substrate 20 which are disposed in a cell face-to-face, wherein the array substrate 20 may be called as a thin film transistor substrate. The liquid crystal display also includes a liquid crystal layer 30 disposed between the color substrate 10 and the array substrate 20, and a back light 40 disposed at one side of the array substrate 20 deviating from the color substrate 10. The structure of the color substrate 10 includes as follows: a substrate 1; black matrices 2 disposed on the substrate 1 in the form of a matrix arrangement; color pixels 3 disposed among the black matrices 2, which include three primary colors such as red, green and blue, and the material of the color pixels 3 is fluorescent material which could emit lights having a corresponding color when stimulated by a certain wavelength light; a flat encapsulation layer 4 covering the black matrices 2 and the color pixels 3; a built-in polarizer 5 attached on the flat encapsulation layer 4; and a transparent electric conducting layer 6 may be further disposed on the built-in polarizer 5.

In the present embodiment, the color substrate and the array substrate disposed in a cell face-to-face are maintained a proper clearance by the spacers, and the liquid crystal material is filled into the clearance to form the liquid crystal layer. The edges of the color substrate and the array substrate are sealed by the resin material, and an exterior polarizer is attached at the outer side of the array substrate to form the liquid crystal display screen. The liquid crystal display screen is configured with corresponding driving circuits and assembled together with a back light having shortwave so as to form the liquid crystal display of the present embodiment.

In the present embodiment, the structures of the array substrate and the liquid crystal layer may be formed by using the prior technology, for example, the specific structure of the liquid crystal layer could be designed as a twisted-nematic (TN) mode, a vertical alignment (VA) mode, a in-plane switching (IPS) mode, a optically compensated bend (OCB) mode or a fringe field switching (FFS) mode. The thin film transistor may adopt technology of amorphous silicon, a low temperature polysilicon, an organic semiconductor or a cadmium selenide and so on.

In the present embodiment, the back light uses a cold cathode fluorescence lamp without coating fluorescent powder or a light emitting diode which could emit shortwave lights. The wavelength of its lights is valued within a range which can stimulate the fluorescent material of the color pixels on the color substrate to emit lights. The wavelength should be shorter than or equal to the stimulated luminescence critical wavelength value of the fluorescent material. The preferred value ranges from 350 nm to 480 nm. There may be many position for locating the back light, for example, a side light type, as usually, is to be disposed at the two sides of the array substrate, as shown in FIG. 6, in which the lights from the back light 40 is guided into the color substrate 10 by a guide panel 50 and a backlight panel 60. A direct type and other types may be also used.

In the liquid crystal display of the present embodiment, a diffusion film 70 is disposed at the light outgoing side of the guide panel 50, viz. the side towards the array substrate 20, as shown in FIG. 6. A polarizing membrane 80 may be further disposed at the upper side of the diffusion film 70 toward the array substrate 20.

The liquid crystal display of the present embodiment could adopt any embodiments of the color substrate. The liquid crystal display adopting the color substrate uses a light stimulation mode of the fluorescent material to replace a light absorption mode of the prior resin material, which could increase the light energy utilization efficiency up to more than 50%. Therefore, the display luminance of the liquid crystal display could be increased, and the energy consumption could be decreased. The color lights of the liquid crystal display in the present embodiment are emitted from the fluorescent material on the color substrate, which avoids the optical path difference which is produced by the lights with various incidence angles passing through the liquid crystal layer in the conventional liquid crystal display apparatus. Therefore, the contrast and the color could not deviate when the image is viewed from various angles, and the liquid crystal display could have equal visual angle characteristic with the active luminescent display, such as the cathode ray tube. The present embodiment improves the visual angle characteristic of the liquid crystal display on the premise that it does not depend on the liquid crystal displaying mode and the design of the optical construction. The polarizer is disposed inside of the color substrate of the liquid crystal display, and the amount of appurtenant parts in the liquid crystal display is also reduced, which makes the display more flimsy. The present embodiment adopts a back light with a single wavelength or narrower wavelength coverage, so it is favorable for optimizing the design of the optical material.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the spirit and scope of the present invention and covered in the claims of the present invention.

What is claimed is:

1. A color substrate, comprising:
   a substrate;
   black matrices disposed on said substrate in the form of a matrix arrangement;
   color pixels disposed alternately among said black matrices, wherein material of said color pixels comprises fluorescent material;
   a flat encapsulation layer covering said black matrices and said color pixels; and
   a polarizer attached to said flat encapsulation layer;
   wherein said flat encapsulation layer comprises a film formed by overlapping organic polymer and inorganic material.

2. The color substrate according to claim 1, further comprising a transparent electric conducting layer attached to said polarizer.

3. The color substrate according to claim 1, wherein longitudinal cross-section of lines of said black matrices is a T shape, and bulgy edges of the T shape cross-sections of said black matrices cover edges of said adjacent color pixels.

4. A liquid crystal display by using a color substrate according to claim 1, comprising a array substrate disposed to face said color substrate, a liquid crystal layer disposed between said color substrate and said array substrate, and a back light disposed at one side of said array substrate departed from said color substrate, wherein wavelength of light emitted by said back light is shorter than or equal to stimulated luminescence critical wavelength of fluorescent material of the color pixels on said color substrate;
   wherein said flat encapsulation layer comprises a film formed by overlapping organic polymer and inorganic material.

5. The liquid crystal display according to claim 4, wherein the color substrate further comprises a transparent electric conducting layer attached to said polarizer.

6. The liquid crystal display according to claim 4, wherein longitudinal cross-section of each line of said black matrices is a T shape, and bulgy edges of the T shape cross-sections of said black matrices cover edges of said adjacent color pixels.

7. The liquid crystal display according to claim 4, wherein the wavelength of light emitted by said back light is in a range of about 350 nm to about 480 nm; and said back light is a cold cathode fluorescence lamp without coating the fluorescent material on its lamp tube wall or a light emitting diode.

8. The liquid crystal display according to claim 4, wherein said polarizer comprises metal grid or material of said polarizer comprises organic self-assembly material containing dye.

9. The color substrate according to claim 1, wherein said polarizer comprises metal grid or material of said polarizer comprises organic self-assembly material containing dye.

10. A manufacturing method of color substrate, comprising:
    forming black matrices on a substrate in the form of a matrix arrangement, and forming color pixels of fluorescent material among said black matrices;
    forming a flat encapsulation layer over the black matrices and the color pixels, wherein forming said flat encapsulation layer comprises: orderly overlapping organic polymer and inorganic material on the above substrate by sputtering, chemical vapor deposition or thermal evaporation so as to form the flat encapsulation layer; and
    forming a polarizer on said flat encapsulation layer.

11. The manufacturing method of color substrate according to claim 10, wherein after forming said polarizer, the method further comprises: depositing transparent electric conducting material on said polarizer so as to form a transparent electric conducting layer.

12. The manufacturing method of color substrate according to claim 10, wherein forming black matrices on a substrate in the form of a matrix arrangement, and forming color pixels of fluorescent material among said black matrices comprises:
   coating pasty inorganic fluorescent material on the substrate, and forming the color pixels in the form of a matrix arrangement by exposing and etching process;
   forming the black matrices on said substrate, wherein said black matrices are alternately disposed among said color pixels.

13. The manufacturing method of color substrate according to claim 12, wherein forming said flat encapsulation layer comprises coating organic encapsulation material on the above substrate and forming the flat encapsulation layer by thermal curing process.

14. The manufacturing method of color substrate according to claim 10, wherein forming black matrices on a substrate in the form of a matrix arrangement, and forming color pixels of fluorescent material among said black matrices comprises:
   forming the black matrices on the substrate in the form of the matrix arrangement;
   forming the color pixels on the above substrate by mask vaporizing organic fluorescent material or ink-jet printing organic fluorescent material, wherein said color pixels are alternately disposed among said black matrices.

15. The manufacturing method of color substrate according to claim 10, wherein forming said polarizer comprises: coating organic self-assembly material on said flat encapsulation layer, and curing and forming said organic self-assembly material by thermal curing or light-cured so as to form the polarizer.

16. The manufacturing method of color substrate according to claim 10, wherein forming said polarizer comprises: depositing metal material on said flat encapsulation layer and forming the polarizer in the form of metal grid by disposing and etching process.

17. The manufacturing method of color substrate according to claim 10, wherein forming said polarizer comprises: attaching an organic film with anisotropic refractive index on said flat encapsulation layer so as to form the polarizer.

* * * * *